W. B. LASHAR.
CHAIN.
APPLICATION FILED JAN. 12, 1911.
1,074,632.
Patented Oct. 7, 1913.
Fig. 1,
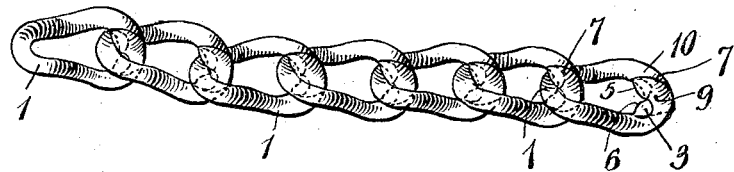
Fig. 2,
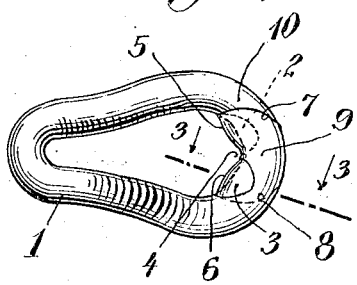
Fig. 3,
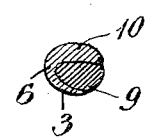
Fig. 4,
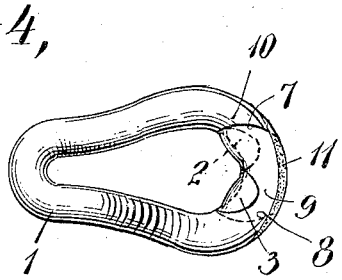
Fig. 5,
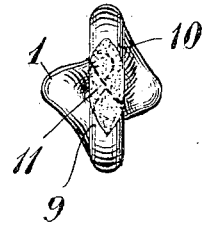
Witnesses:
Jessie B. Kay
G. Brummerhop.
Walter B. Lashar, Inventor
By his Attorneys
Duncan & Duncan

UNITED STATES PATENT OFFICE.

WALTER E. LASHAR, OF BRIDGEPORT, CONNECTICUT.

CHAIN.

1,074,632.  Specification of Letters Patent.  Patented Oct. 7, 1913.

Application filed January 12, 1911.  Serial No. 602,184.

*To all whom it may concern:*

Be it known that I, WALTER B. LASHAR, a citizen of the United States, and resident of Bridgeport, Fairfield county, Connecticut, have made a certain new and useful Invention Relating to Chains, of which the following is a specification, taken in connection with the accompanying drawing, which forms part of the same.

This invention relates especially to chains in which the ends of the link material are twisted together and one or more of their tips flattened and bent around the adjacent portions of the other link end so as to form inclosing gripping tips, the whole being preferably swaged together to form a substantially uniform section and secure a high degree of adhesion between the gripping lapped ends.

In the accompanying drawing showing in a somewhat diagrammatic manner an illustrative embodiment of this invention, Figure 1 is a view showing a chain of this description. Fig. 2 is an enlarged view of one of the links. Fig. 3 is a section thereof taken substantially along the line 3—3 of Fig. 2. Fig. 4 is a similar view showing a welded connection; and Fig. 5 is an end view thereof.

As shown in the illustrative embodiment of this invention shown in the drawings, the links 1 may be formed of link material, such as soft or special steel or other suitable material, the ends 7 and 8 of which may be twisted together and flattened in connection with the somewhat diagonal severing of the lengths of link material if desired, so that the tip 3 of one of these ends of link material may be brought under the coöperating neck 9 and then brought up against it so as to largely or entirely encircle it. This may be readily done by flattening the ends of the link material and forming gripping tips 2, 3 thereon and then when the lapped ends of the link material are brought closely together bending these tips and the connected portion 6 around the necks of the coöperating lapped other ends of the link material and simultaneously swaging the parts together and preferably giving them a substantially uniform and large section as indicated in Fig. 3. In this way a high degree of adhesion is secured between the adjacent parts in addition to the mechanical strength due to the twisting of the ends of the link material which are preferably located adjacent the link ends as shown, so that the metal if originally clean adheres strongly, producing what is practically a dry weld. It is also desirable to have the twisted ends form a suitable wearing notch, such as 4, between the portions 5 and 6 on the inside of the link end for engagement by the coöperating link so as to minimize lateral displacement of the parts and this is of course also promoted by curbing or bending the links in the usual way, although of course this invention is not limited to curbed links since other forms of links may be similarly produced, although it is desirable to form the links rather long and narrow to prevent undesirable lateral displacement of the ends of the link material. The extent to which the lapped ends of the link material may be twisted around each other may of course be varied to a considerable extent, the greater the extent to which the gripping tip or end of the link material incloses the coöperating neck or portion of the other link end the greater degree of rigidity and strength is secured. If desired also the mechanically twisted gripping ends of the link material may be further secured in any desired way as by electrically welding their lapped exposed portions at the end of the link as indicated at 11 in Figs. 4 and 5 which may be conveniently done either after or in connection with the final swaging shaping of the links, although of course this is not necessary in all cases.

Having described this invention in connection with a number of illustrative embodiments, forms, proportions, arrangements and methods of forming the parts, to the details of which disclosure the invention of course is not to be limited, what is claimed as new and what is desired to be secured by letters patent is set forth in the appended claims;

1. The chain comprising curbed links having ends formed of the twisted gripping ends of the link material, each end of the link material being flattened and having its tip substantially three-quarters inclosing the adjacent neck of the other end of the link material, said twisted ends being swaged to substantially uniform section and provided with a wearing notch on the inside of said link end between said gripping tips and having the lapped ends of the link material at the outer end of each link electrically welded.

2. The chain comprising links having ends formed of the twisted gripping ends of the link material, each end of the link material being flattened and having its tip substantially three-quarters inclosing the adjacent neck of the other end of the link material, said twisted ends being swaged to substantially uniform section and provided with a wearing notch on the inside of said link end between said gripping tips.

3. The chain comprising links having ends formed of the twisted gripping ends of the link material, each end of the link material being flattened and having its tip passed under and partly around the adjacent neck of the other end of the link material, said twisted ends being swaged to substantially uniform section and provided with a wearing notch on the inside of said link end between said gripping tips.

4. The chain comprising links having ends formed of the interlocked gripping ends of the link material, each end of the link material having its tip passed beneath and partly around the adjacent other end of the link material, said interlocked ends being swaged together and provided with a wearing notch on the inside of said link end between said gripping tips.

5. The chain comprising links having ends formed of the interlocked gripping ends of the link material, each end of the link material having its tip passed partly around the adjacent other end of the link material, said interlocked ends being swaged together and provided with a wearing notch on the inside of said link end between said gripping tips and portions of said interlocked ends being welded together.

WALTER B. LASHAR.

Witnesses:
JESSIE B. KAY,
HARRY L. DUNCAN.